United States Patent
Wu et al.

(10) Patent No.: US 12,147,277 B2
(45) Date of Patent: Nov. 19, 2024

(54) ELECTRONIC DEVICE

(71) Applicants: Che-An Wu, Taipei (TW); Chuang-Yuan Cheng, Taipei (TW); Chen-Yi Huang, Taipei (TW); Hao-Jen Fang, Taipei (TW); Chih-Wen Chiang, Taipei (TW)

(72) Inventors: Che-An Wu, Taipei (TW); Chuang-Yuan Cheng, Taipei (TW); Chen-Yi Huang, Taipei (TW); Hao-Jen Fang, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 232 days.

(21) Appl. No.: 17/978,238

(22) Filed: Nov. 1, 2022

(65) Prior Publication Data

US 2023/0176628 A1    Jun. 8, 2023

Related U.S. Application Data

(60) Provisional application No. 63/399,223, filed on Aug. 19, 2022, provisional application No. 63/286,564, filed on Dec. 7, 2021.

(51) Int. Cl.
*G06F 1/16* (2006.01)
*F16C 11/04* (2006.01)
*F21V 33/00* (2006.01)

(52) U.S. Cl.
CPC .......... *G06F 1/1681* (2013.01); *G06F 1/1667* (2013.01); *G06F 1/1675* (2013.01); *F16C 11/04* (2013.01); *F21V 33/0052* (2013.01); *G06F 1/1616* (2013.01); *G06F 1/1684* (2013.01)

(58) Field of Classification Search
CPC .... G06F 1/1616; G06F 1/1667; G06F 1/1675; G06F 1/1681; G06F 1/1684; G06F 1/1656; F21V 33/0052
See application file for complete search history.

(56) References Cited

U.S. PATENT DOCUMENTS

| | | | | |
|---|---|---|---|---|
| 7,436,657 | B2 * | 10/2008 | Motai ...................... | G06F 1/162 362/85 |
| 8,305,746 | B2 * | 11/2012 | Yokoyama ............ | G06F 1/1616 362/85 |
| 9,195,275 | B2 * | 11/2015 | Liu ........................ | G06F 1/1686 |
| 10,534,408 | B2 * | 1/2020 | Cheng ................... | G06F 1/1616 |
| 11,132,026 | B2 * | 9/2021 | Yang ...................... | G06F 1/1647 |
| 2005/0047073 | A1 * | 3/2005 | Lo ......................... | G06F 1/1616 362/253 |

\* cited by examiner

*Primary Examiner* — Nidhi Thaker
(74) *Attorney, Agent, or Firm* — JCIPRNET

(57) ABSTRACT

An electronic device including a first body, a second body, a pivoting shaft, a driving module, and a light source is provided. The first body includes a first casing and a second casing movably disposed on the first casing. The second body has a pivoting part and a light reflecting part located at the pivoting part. The pivoting shaft is connected to the pivoting part. The second body is pivoted to the first body through the pivoting shaft. The pivoting shaft, the driving module, and the light source are disposed in the first body. The driving module is connected to the pivoting shaft and contacts the second casing. When the second body rotates relative to the first body, the pivoting shaft drives the driving module to push the second casing to lift to form a light emitting slit between the second casing and the pivoting part.

12 Claims, 12 Drawing Sheets

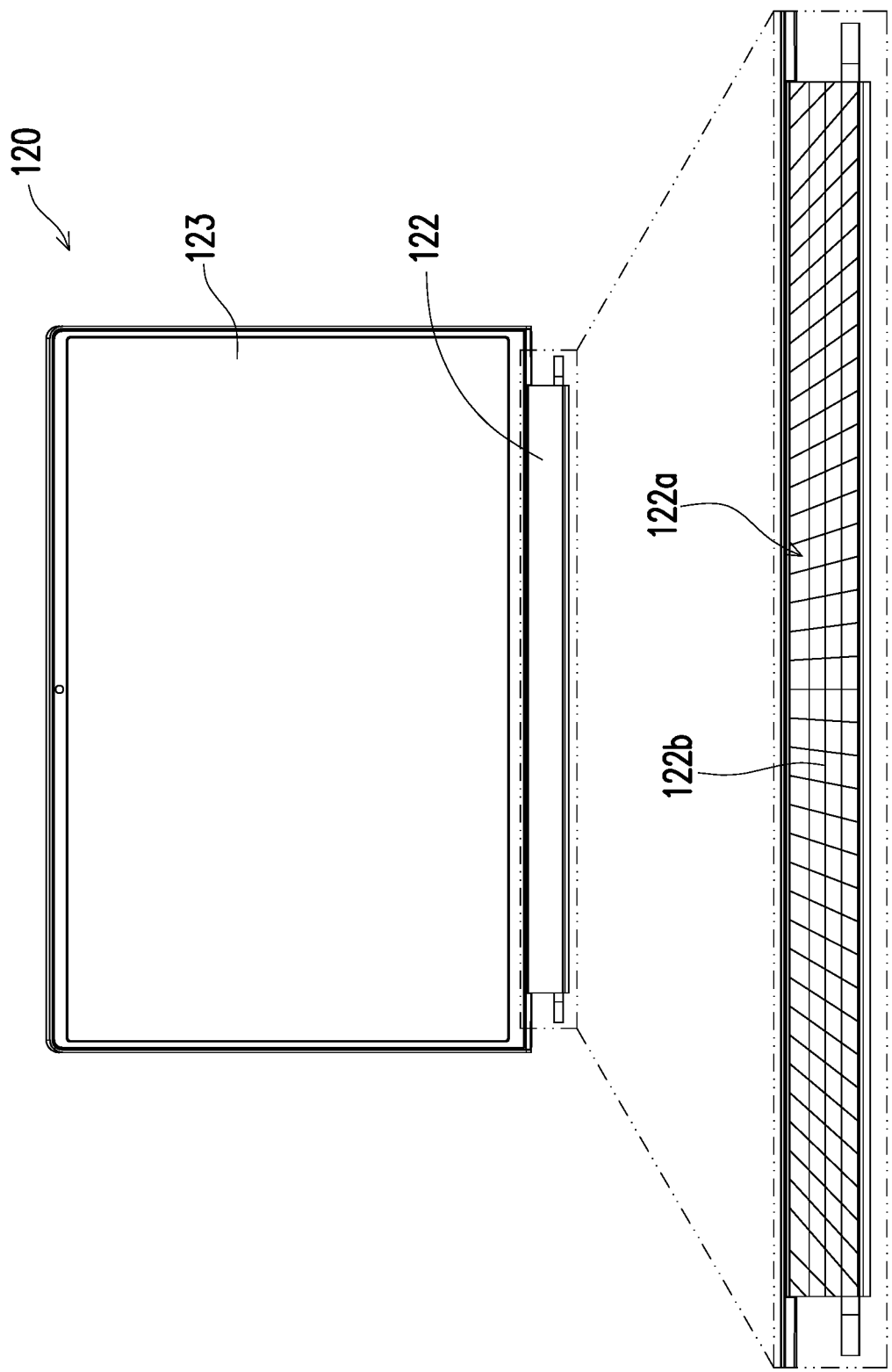

ELECTRONIC DEVICE

CROSS-REFERENCE TO RELATED APPLICATION

This application claims the priority benefits of U.S. provisional application Ser. No. 63/286,564, filed on Dec. 7, 2021, and U.S. provisional application Ser. No. 63/399,223, filed on Aug. 19, 2022. The entirety of each of the above-mentioned patent applications is hereby incorporated by reference herein and made a part of this specification.

BACKGROUND

Technical Field

This disclosure relates to an electronic device, and in particular to an electronic device designed with a lighting effect.

Description of Related Art

Laptops are an important tool in modern life and work. In order to enhance the operating experience, laptops with lighting effects integrated into the keyboard or monitor have been proposed to bring a different visual experience to users. For example, a common way to integrate lighting effects into the display of laptops is to place a light-transmitting panel on the lower edge of the display (e.g., near the pivoting shaft), and to place the light source inside the display corresponding to the light-transmitting panel. To improve light uniformity, one way is to increase the number of light sources, but this will lead to high manufacturing costs. Another way is to increase the distance between the light sources and the light-transmitting panel, but this will lead to a thick display that cannot meet the needs of thin and light designs.

SUMMARY

The disclosure provides an electronic device that not only satisfies the need for a thin and light design, but also helps to improve light uniformity.

The disclosure proposes an electronic device including a first body, a second body, a pivoting shaft, a driving module, and a light source. The first body includes a first casing and a second casing movably disposed on the first casing. The second body has a pivoting part and a light reflecting part located at the pivoting part. The pivoting shaft is connected to the pivoting part. The second body is pivoted to the first body through the pivoting shaft. The pivoting shaft, the driving module, and the light source are disposed in the first body. The driving module is connected to the pivoting shaft and contacts the second casing. When the second body rotates relative to the first body, the pivoting shaft drives the driving module, and the driving module pushes the second casing to lift to form a light emitting slit between the second casing and the pivoting part, and light emitted from the light source is directed to the light reflecting part through the light emitting slit.

According to an embodiment of the disclosure, the driving module includes a first gear connected to the pivoting shaft, a second gear engaged with the first gear, a third gear engaged with the second gear, and a drive member connected to the third gear. The drive member contacts the second casing. When the second body rotates relative to the first body, the first gear rotates synchronously with the pivoting shaft, so that the first gear drives the second gear. At the same time, the second gear drives the third gear, and the drive member rotates synchronously with the third gear and pushes the second casing to lift to form the light emitting slit between the second casing and the pivoting part of the second body.

According to an embodiment of the disclosure, the drive member is coaxially disposed with the third gear.

According to an embodiment of the disclosure, the first gear is coaxially disposed with the pivoting shaft.

According to an embodiment of the disclosure, the drive member has a drive part and a support convex arc part connected to the drive part. The drive part contacts the second casing to push the second casing to rotate and lift relative to the first casing. When the second body rotates relative to the first body to an angle greater than a predetermined angle, the drive part is separated from the second casing, and the support convex arc part contacts the second casing.

According to an embodiment of the disclosure, the second casing has a guide part facing the first casing and a buffer part connected to the guide part, and the drive part slidingly contacts the guide part. When the second body rotates relative to the first body to an angle greater than the predetermined angle, the drive part is separated from the guide part, and the support convex arc part contacts the buffer part.

According to an embodiment of the disclosure, the light source is disposed on the second casing corresponding to the light emitting slit, and the first casing has a reflect part disposed corresponding to the light source and the light emitting slit. The light emitted from the light source is directed to the reflect part, and then is reflected by the reflect part to the light emitting slit, and is directed to the light reflecting part through the light emitting slit.

According to an embodiment of the disclosure, the light source is lifted with the second casing, and a distance between the light source and the reflect part is increased from a first distance to a second distance.

According to an embodiment of the disclosure, the light source is disposed on the first casing corresponding to the light emitting slit, and the light emitted from the light source is directed toward the light emitting slit, and is directed to the light reflecting part through the light emitting slit.

According to an embodiment of the disclosure, the second body further has a display part connected to the pivoting part, and there is a gap between a reflective surface of the light reflecting part and a display surface of the display part. A part of the light reflecting part is located in the light emitting slit.

According to an embodiment of the disclosure, the first body further includes a third casing mounted on the first casing, and the second casing has a first end pivotally connected to the third casing and a second end opposite to the first end. The driving module contacts the second end.

According to an embodiment of the disclosure, the second casing is located between the pivoting shaft and the third casing. When the second body rotates relative to the first body, the driving module pushes the second end of the second casing, so that the first end of the second casing rotates relative to the third casing, and the second end is lifted to form the light emitting slit with the pivoting part.

Based on the above, the electronic device of the disclosure, in line with the design requirement of thin and light weight of the product, has a light source disposed in the first body so as to lengthen the distance of the light emitted from the light source to the light reflecting part of the second body and further improve the light uniformity of the light reflected from the light reflecting part.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A to FIG. 4C are schematic diagrams of a second body according to different embodiments, respectively.

DESCRIPTION OF THE EMBODIMENTS

Figure 1A:
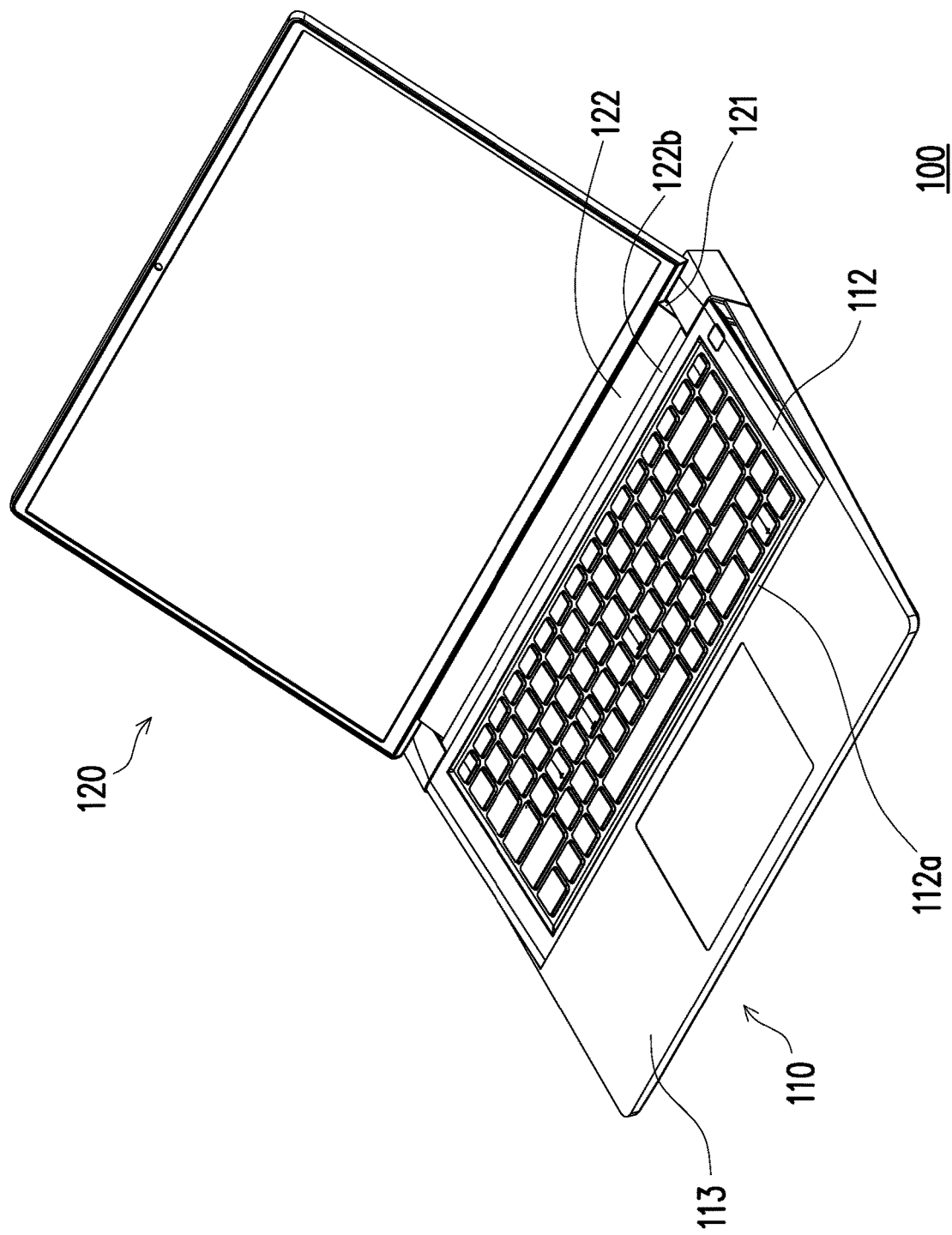
FIG. 1A is a schematic diagram of an electronic device according to an embodiment of the disclosure in an unfolded state.
Figure 1B:
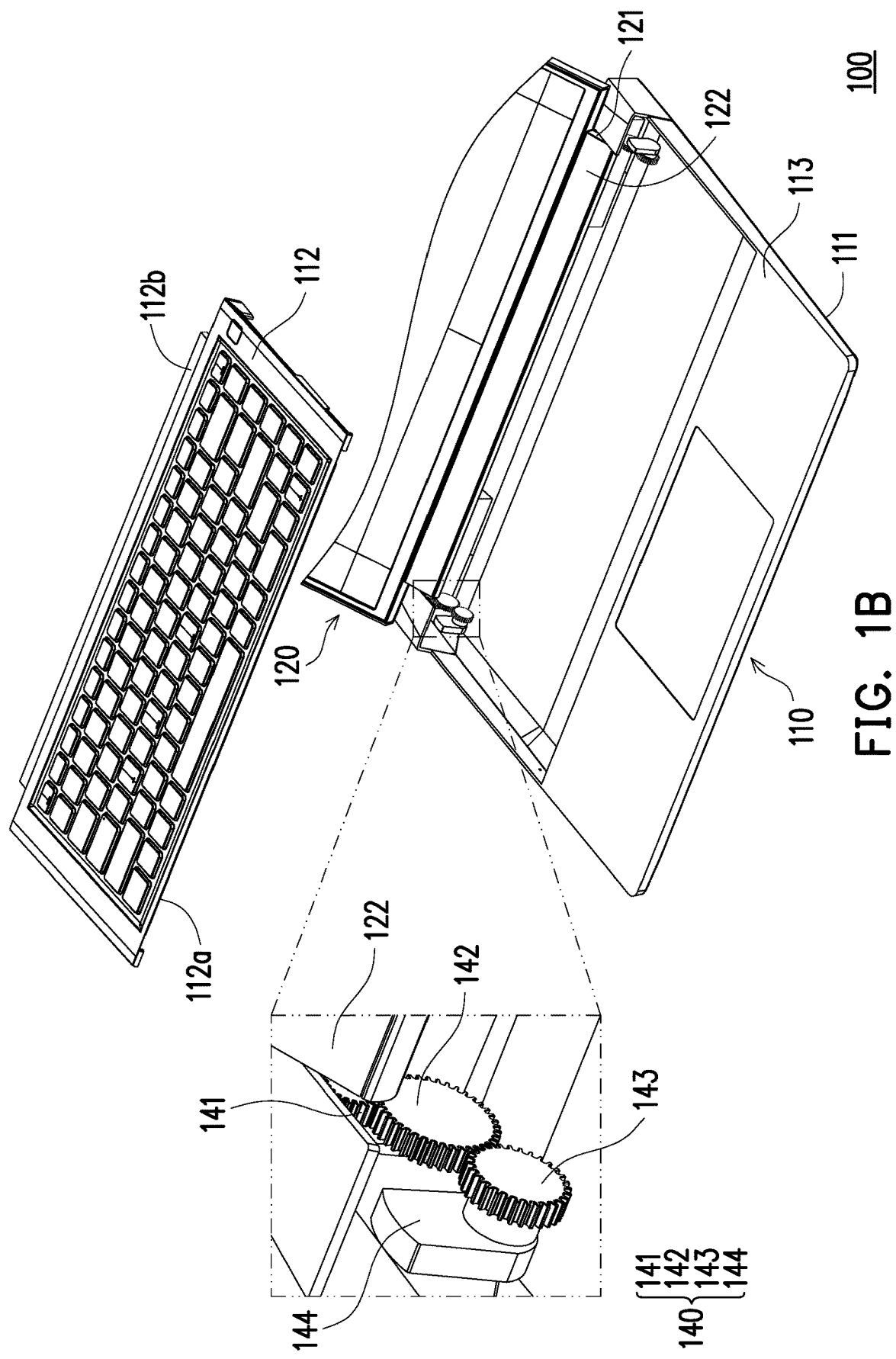
FIG. 1B is a partial exploded schematic diagram of an electronic device according to an embodiment of the disclosure.
Figure 1C:
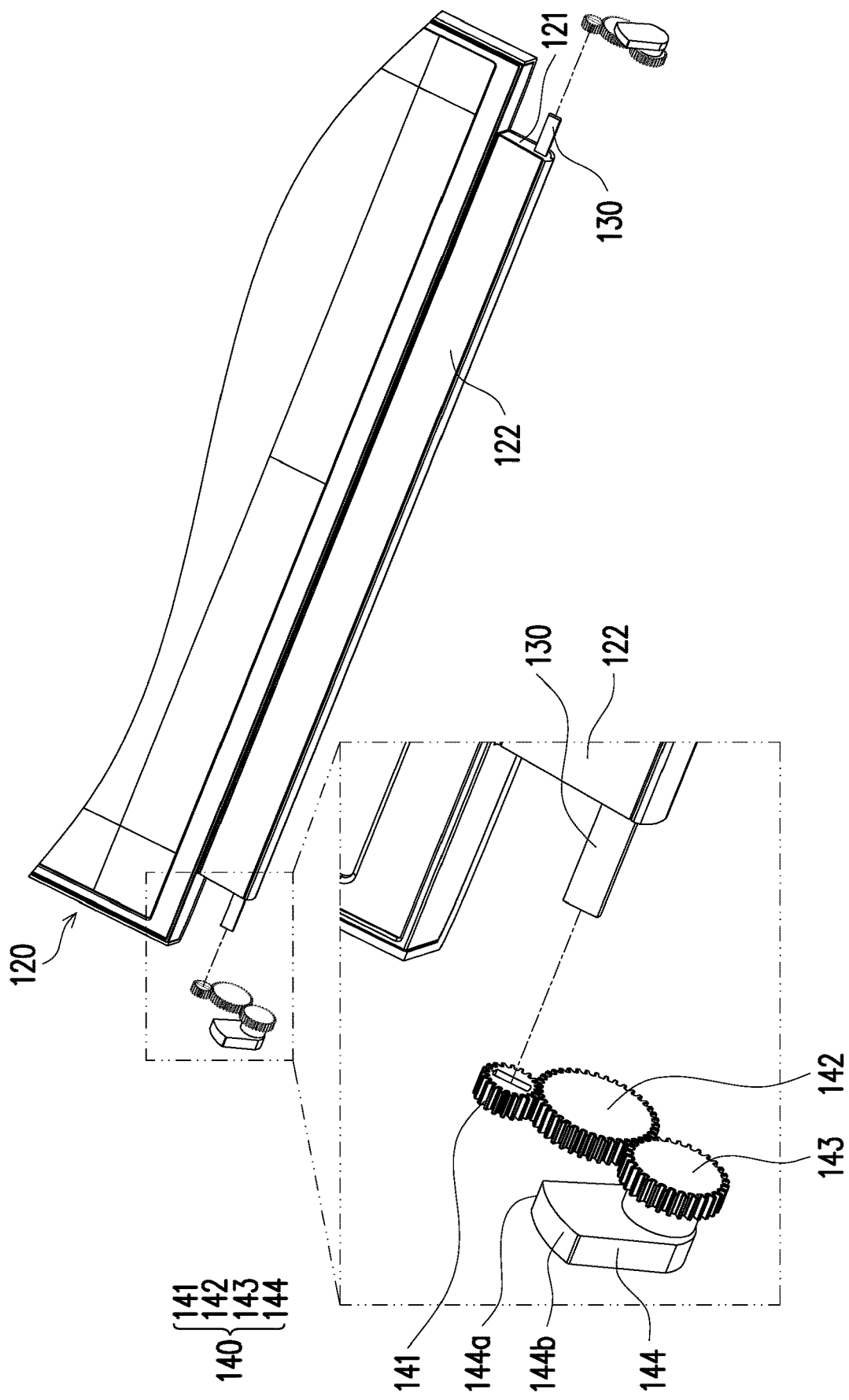
FIG. 1C is a partial exploded schematic diagram of a second body and a driving module of FIG. 1B.
Figure 1D:
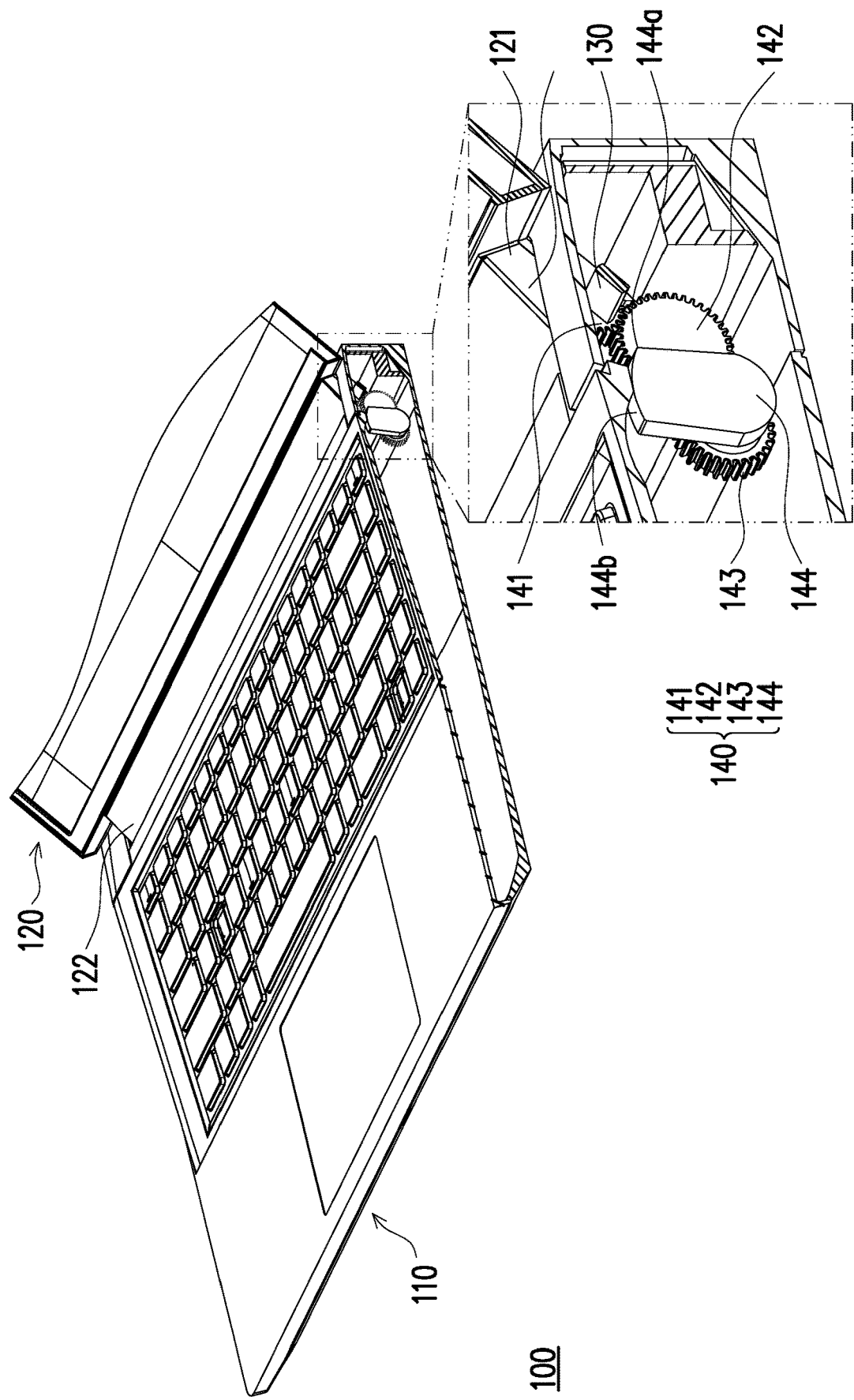
FIG. 1D is a partial cross-sectional schematic diagram of the electronic device of FIG. 1A at a section through a driving module.

FIG. 1A is a schematic diagram of an electronic device according to an embodiment of the disclosure in an unfolded state. FIG. 1B is a partial exploded schematic diagram of an electronic device according to an embodiment of the disclosure. FIG. 1C is a partial exploded schematic diagram of a second body and a driving module of FIG. 1B. FIG. 1D is a partial cross-sectional schematic diagram of the electronic device of FIG. 1A at a section through a driving module. FIG. 2A to FIG. 2D are partial cross-sectional schematic diagrams of an electronic device according to an embodiment of the disclosure from a closed state to an unfolded state. In particular, a part of a second body 120 is intentionally omitted in FIG. 1B to FIG. 1D to facilitate the representation of the relative positions of a driving module 140 and a pivoting shaft 130, and the details of gears of the driving module 140 are intentionally omitted in FIG. 2A to FIG. 2D to facilitate a concise representation of operating principle thereof.

Referring to FIG. 1A to FIG. 1C, FIG. 2A, and FIG. 2D, according to this embodiment, an electronic device 100 can be a notebook computer, and includes a first body 110, a second body 120, a pivoting shaft 130, a driving module 140, and a light source 150. The first body 110 is a host with logic computing and data access capabilities, and the second body 120 is a display pivoted to the first body 110 to rotate open and close relative to the first body 110.

In detail, the first body 110 includes a first casing 111, a second casing 112, and a third casing 113. The second casing 112 is movably disposed on the first casing 111, and the third casing 113 is mounted and fixed on the first casing 111. The second casing 112 is disposed side by side with the third casing 113. The second casing 112 has a first end 112a and a second end 112b opposite to the first end 112a, and the first end 112a is pivotally connected to the third casing 113. The first end 112a serves as a pivot end in the second casing 112 that rotates relative to the third casing 113, and the second end 112b serves as a lift end in the second casing 112 that lifts and lowers relative to the first casing 111.

As shown in FIG. 1A to FIG. 1C and FIG. 2D, the second body 120 has a pivoting part 121 and a light reflecting part 122 located at the pivoting part 121. The second end 112b of the second casing 112 is close to the pivoting part 121 and the light reflecting part 122, and the second end 112b is located between the pivoting part 121 and the first end 112a. In addition, the second casing 112 is located between the pivoting part 121 and the third casing 113. As shown in FIG. 1C and FIG. 1D, the pivoting shaft 130 is connected to the pivoting part 121. The pivoting shaft 130 is disposed in the first body 110 and is pivotally connected to the first body 110. Therefore, the second body 120 may rotate relative to the first body 110 through the pivoting shaft 130.

Figure 2A:
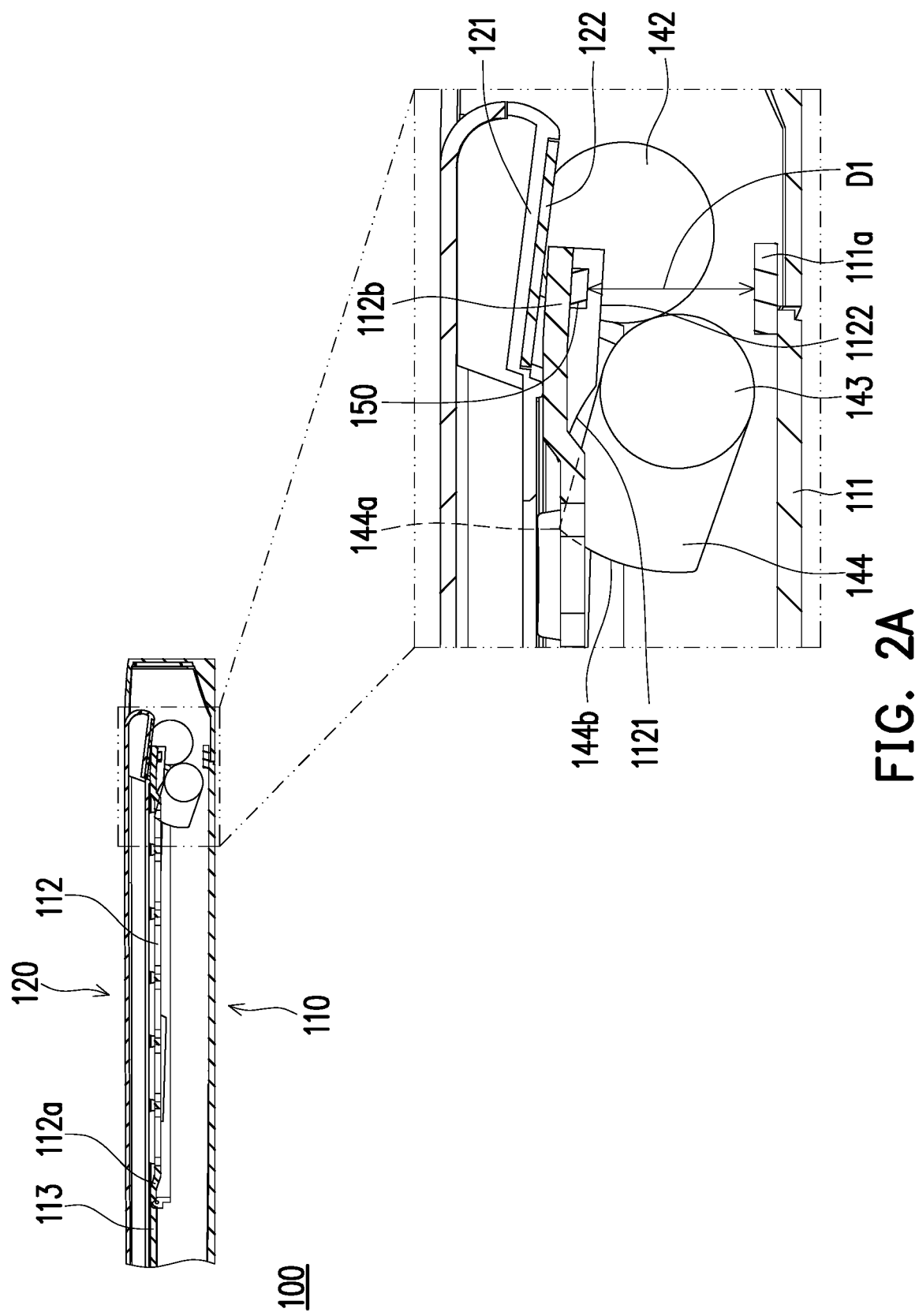
FIG. 2A to FIG. 2D are partial cross-sectional schematic diagrams of an electronic device according to an embodiment of the disclosure from a closed state to an unfolded state.
Figure 2B:
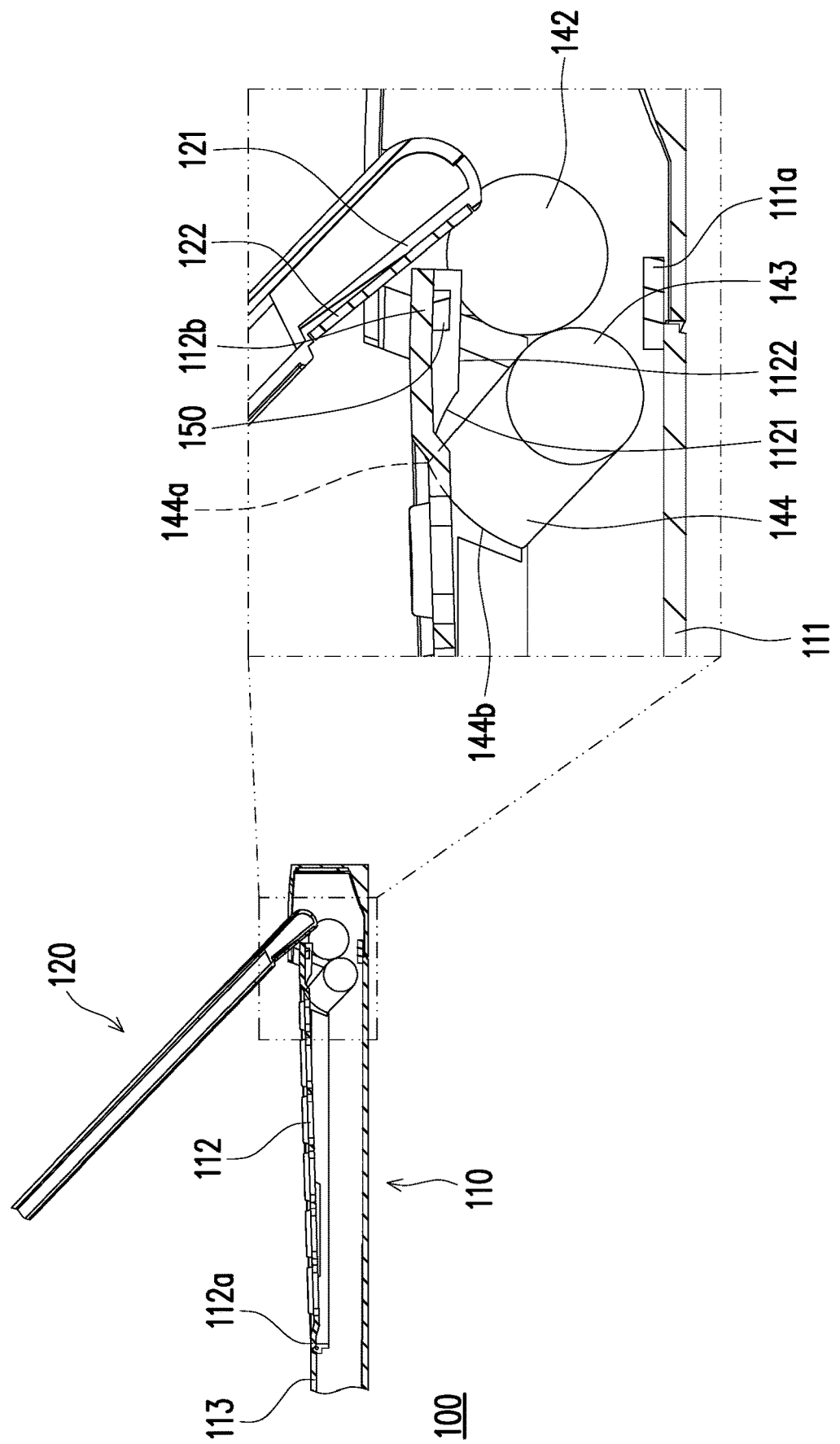
Figure 2C:
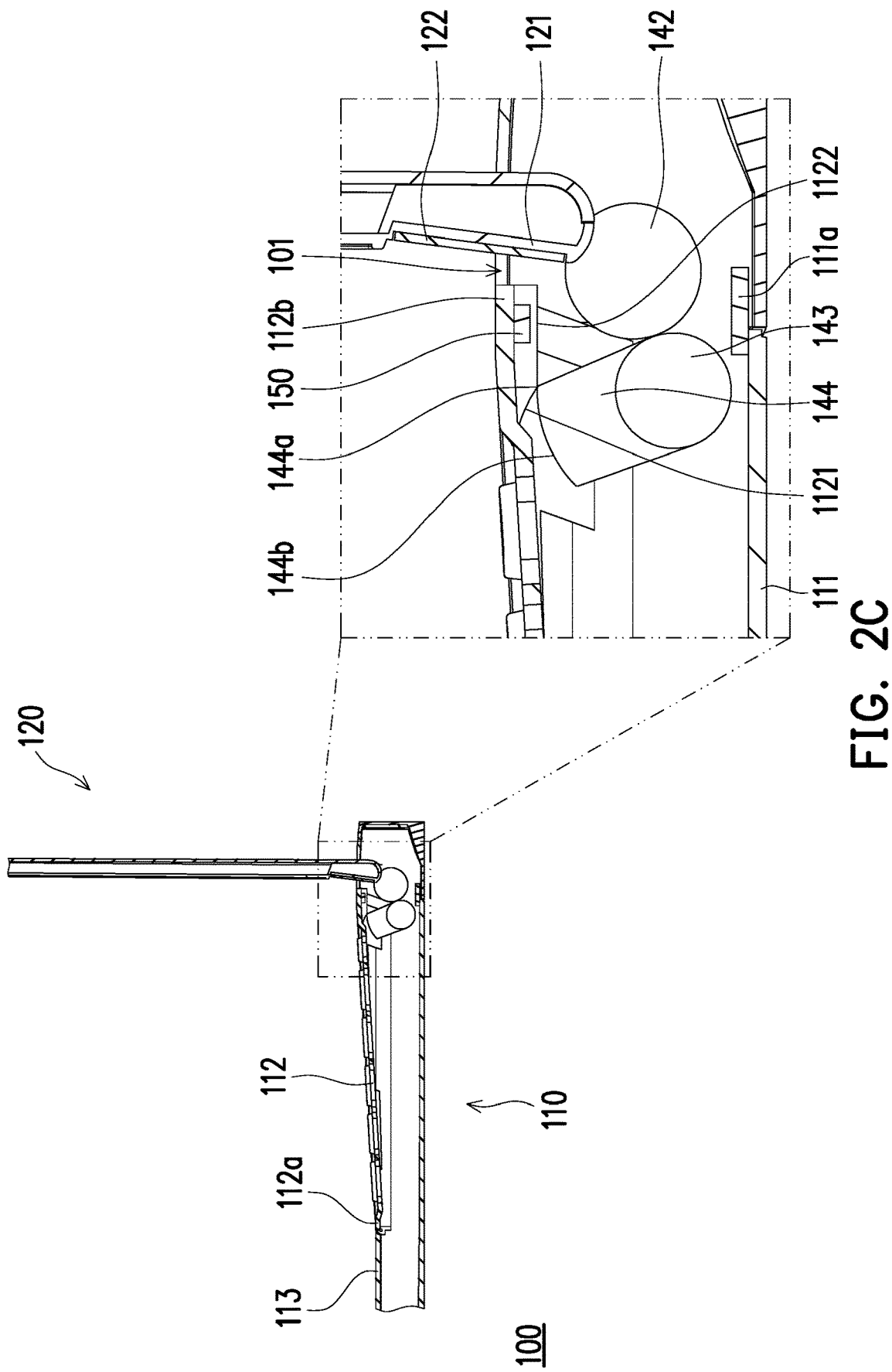
Figure 2D:
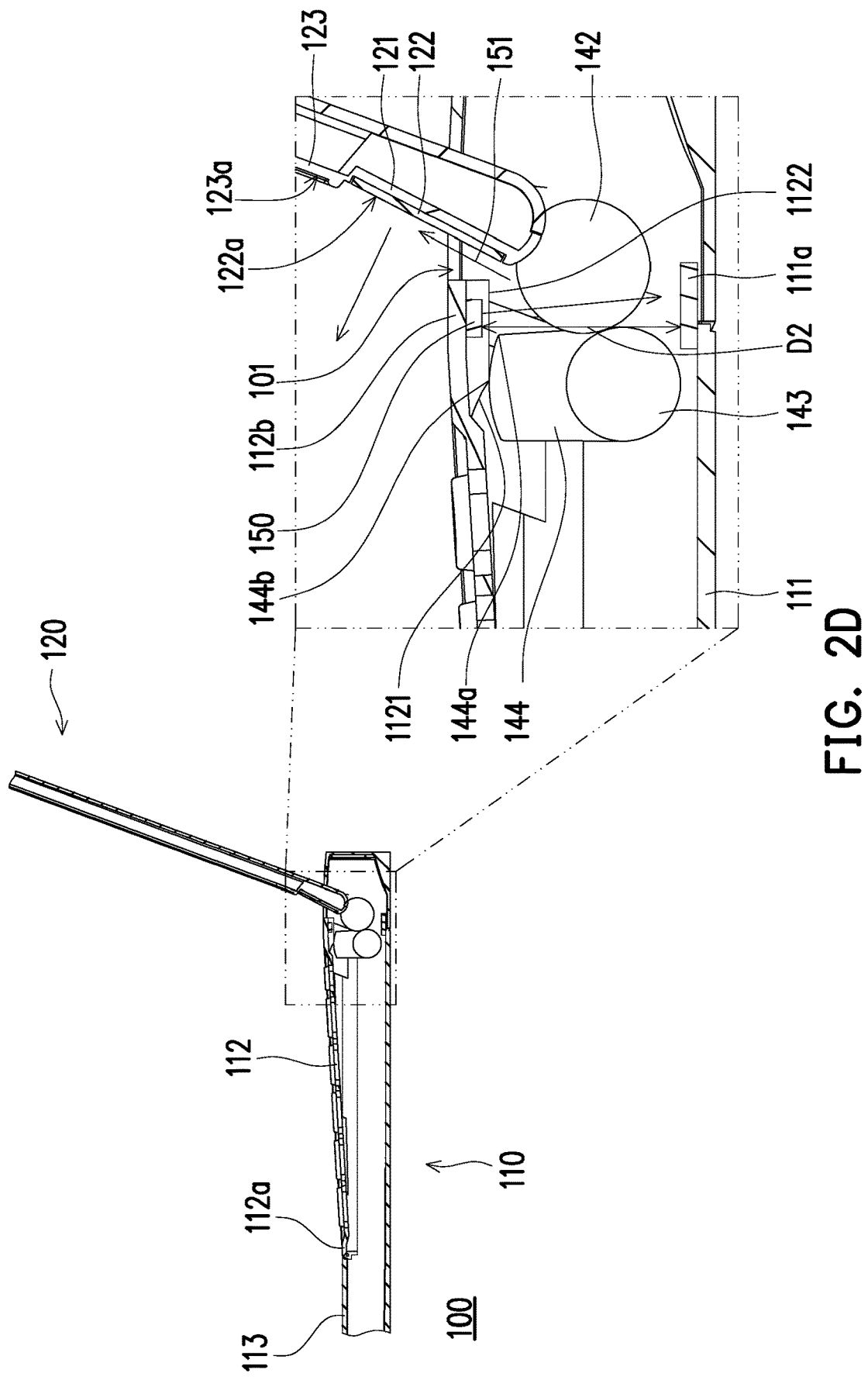

As shown in FIG. 1B, FIG. 1C, FIG. 2A, and FIG. 2D, the driving module 140 is disposed in the first body 110. The driving module 140 is connected to the pivoting shaft 130 and contacts the second end 112b of the second casing 112. As shown in FIG. 2A to FIG. 2D, when the second body 120 rotates and unfolds relative to the first body 110, the pivoting shaft 130 (see FIG. 1C or FIG. 1D) that rotates synchronously with the second body 120 drives the driving module 140, causing the driving module 140 to push the second casing 112. Further, when the second end 112b of the second casing 112 is pushed by the driving module 140, the first end 112a of the second casing 112 rotates relative to the third casing 113, and the second end 112b is lifted upward to form a light emitting slit 101 with the pivoting part 121 of the second body 120, as shown in FIG. 2B to FIG. 2D.

As shown in FIG. 2B to FIG. 2D, when the second body 120 rotates and unfolds relative to the first body 110, the light reflecting part 122 rotates with the pivoting part 121 relative to the first body 110, and partially moves into the light emitting slit 101 formed between the pivoting part 121 of the second body 120 and the second end 112b of the second casing 112.

As shown in FIG. 2D, according to this embodiment, the light source 150 is disposed in the first body 110 and is located between the second casing 112 and the first casing 111. Further, the light source 150 is disposed on the second end 112b of the second casing 112, and the position of the light source 150 is close to the light emitting slit 101. On the other hand, the first casing 111 has a reflect part 111a. The position of the reflect part 111a corresponds to the second end 112b of the second casing 112 and the light emitting slit 101. Therefore, light 151 emitted from the light source 150 is first directed to the reflect part 111a, and is reflected by the reflect part 111a and directed to the light emitting slit 101, and then the light 151 is directed to the light reflecting part 122 through the light emitting slit 101. Thus, the user can see the light 151 mapped on the light reflecting part 122.

Continuing from the above, because the light source 150 is disposed in the first body 110, the thickness of the second body 120 may be reduced to meet the design requirements of thinner and lighter products. In addition, by lengthening a transmission path of the light 151, the light uniformity of the light 151 reflected from the light reflecting part 122 may be significantly improved to present an excellent lighting effect. For example, the light source 150 may be composed of multiple light emitting diodes. In the case of a transmission distance of the light 151 is lengthened, a small amount of the light source 150 may still present excellent lighting effect, helping to reduce the cost of production.

As shown in FIG. 2A and FIG. 2D, the light source 150 is disposed on the second end 112b of the second casing 112. As the second end 112b of the second casing 112 is lifted upward, a distance between the light source 150 and the reflect part 111a may be increased from a first distance D1 to a second distance D2 to lengthen the transmission distance of the light 151. Conversely, as the second end 112b of the second casing 112 is lowered, the distance between the light source 150 and the reflect part 111a may be reduced from the second distance D2 to the first distance D1.

As shown in FIG. 2D, the second body 120 further has a display part 123 connected to the pivoting part 121, and there is a gap between a reflective surface 122a of the light reflecting part 122 and a display surface 123a of the display part 123. Specifically, the display surface 123a of the display part 123 is not flush with the reflective surface 122a, and protrudes relative to the reflective surface 122a to avoid the light 151 from irradiating the display surface 123a.

As shown in FIG. 1B to FIG. 1D, FIG. 2A, and FIG. 2D, according to this embodiment, the driving module 140 includes a first gear 141 connected to the pivoting shaft 130, a second gear 142 engaged with the first gear 141, a third gear 143 engaged with the second gear 142, and a drive member 144 connected to the third gear 143. The first gear 141 is coaxially disposed with the pivoting shaft 130 and rotates synchronously. In addition, the third gear 143 is coaxially disposed with the drive member 144, and rotates synchronously.

Referring to FIG. 1D and FIG. 2A to FIG. 2D, the drive member 144 contacts the second end 112b of the second casing 112. When the second body 120 rotates and unfolds relative to the first body 110, the first gear 141 rotates synchronously with the pivoting shaft 130, so that the first gear 141 drives the second gear 142. At the same time, the second gear 142 drives the third gear 143, and the drive member 144 rotates synchronously with the third gear 143 to push the second end 112b of the second casing 112 to lift upward, so as to form the light emitting slit 101 between the second end 112b of the second casing 112 and the pivoting part 121 of the second body 120.

As shown in FIG. 1C, FIG. 1D, and FIG. 2A to FIG. 2C, the drive member 144 has a drive part 144a and a support convex arc part 144b connected to the drive part 144a. Before the second body 120 rotates relative to the first body 110 and unfolds to an angle greater than a predetermined angle (e.g., 90 degrees), the drive part 144a contacts the second end 112b of the second casing 112, and pushes the second casing 112 to rotate relative to the first casing 111, causing the second end 112b of the second casing 112 to lift upward.

As shown in FIG. 2C and FIG. 2D, once the second body 120 rotates relative to the first body 110 and unfolds to an angle greater than a predetermined angle (e.g., 90 degrees), the drive part 144a is separated from the second end 112b of the second casing 112, and the support convex arc part 144b contacts the second end 112b of the second casing 112. Even though the second body 120 continues to rotate and unfold relative to the first body 110, the support convex arc part 144b slides to contact the second end 112b of the second casing 112, but does not push the second end 112b of the second casing 112 further upward, so that the second end 112b of the second casing 112 supported by the support convex arc part 144b remains at a maximum lift height.

As shown in FIG. 2A to FIG. 2C, the second end 112b of the second casing 112 has a guide part 1121 facing the first casing 111 and a buffer part 1122 connected to the guide part 1121. Before the second body 120 rotates relative to the first body 110 and unfolds to an angle greater than a predetermined angle (e.g., 90 degrees), the drive part 144a slides to contact the guide part 1121 and moves in the direction where the buffer part 1122 is located.

As shown in FIG. 2C and FIG. 2D, when the second body 120 rotates relative to the first body 110 and unfolds to an angle greater than a predetermined angle (e.g., 90 degrees), the drive part 144a is separated from the guide part 1121, and the support convex arc part 144b contacts the buffer part 1122. Even though the second body 120 continues to rotate and unfold relative to the first body 110, the support convex arc part 144b slides to contact the buffer part 1122, but does not push the second end 112b of the second casing 112 further upward, so that the second end 112b of the second casing 112 supported by the support convex arc part 144b remains at a maximum lift height.

Figure 3:
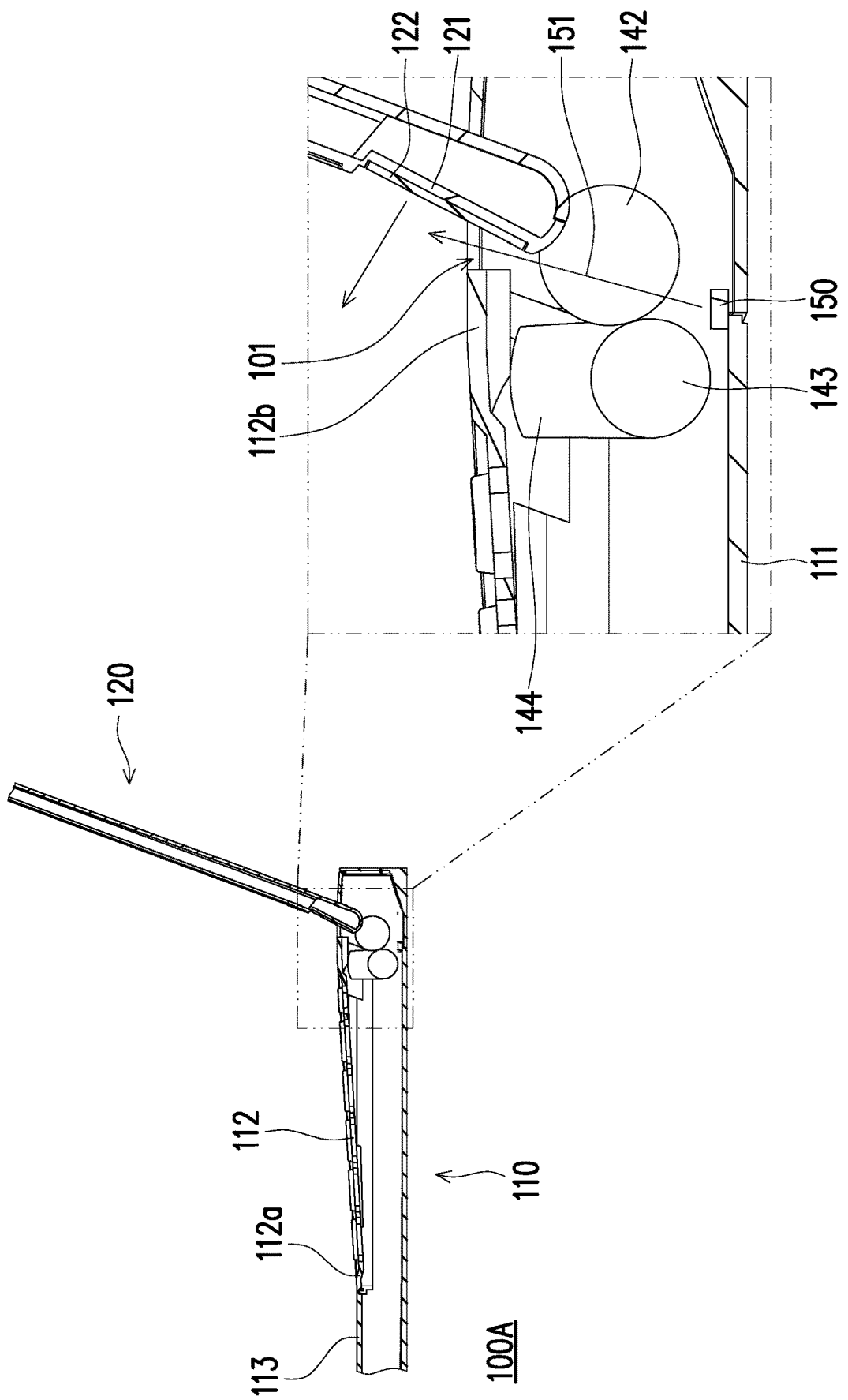
FIG. 3 is a partial cross-sectional schematic diagram of an electronic device according to another embodiment of the disclosure in an unfolded state.

FIG. 3 is a partial cross-sectional schematic diagram of an electronic device according to another embodiment of the disclosure in an unfolded state. Referring to FIG. 3, an electronic device 100A according to this embodiment has substantially the same design principle as the electronic device 100 according to the previous embodiment. The difference is that according to this embodiment, the light source 150 is disposed on the first casing 111 and is positioned corresponding to the second end 112b of the second casing 112 and the light emitting slit 101. Thus, the light 151 emitted from the light source 150 may be directed to the light emitting slit 101 to be directed to the light reflecting part 122 through the light emitting slit 101, and then directed to the user after being reflected by the light reflecting part 122.

Figure 4B:
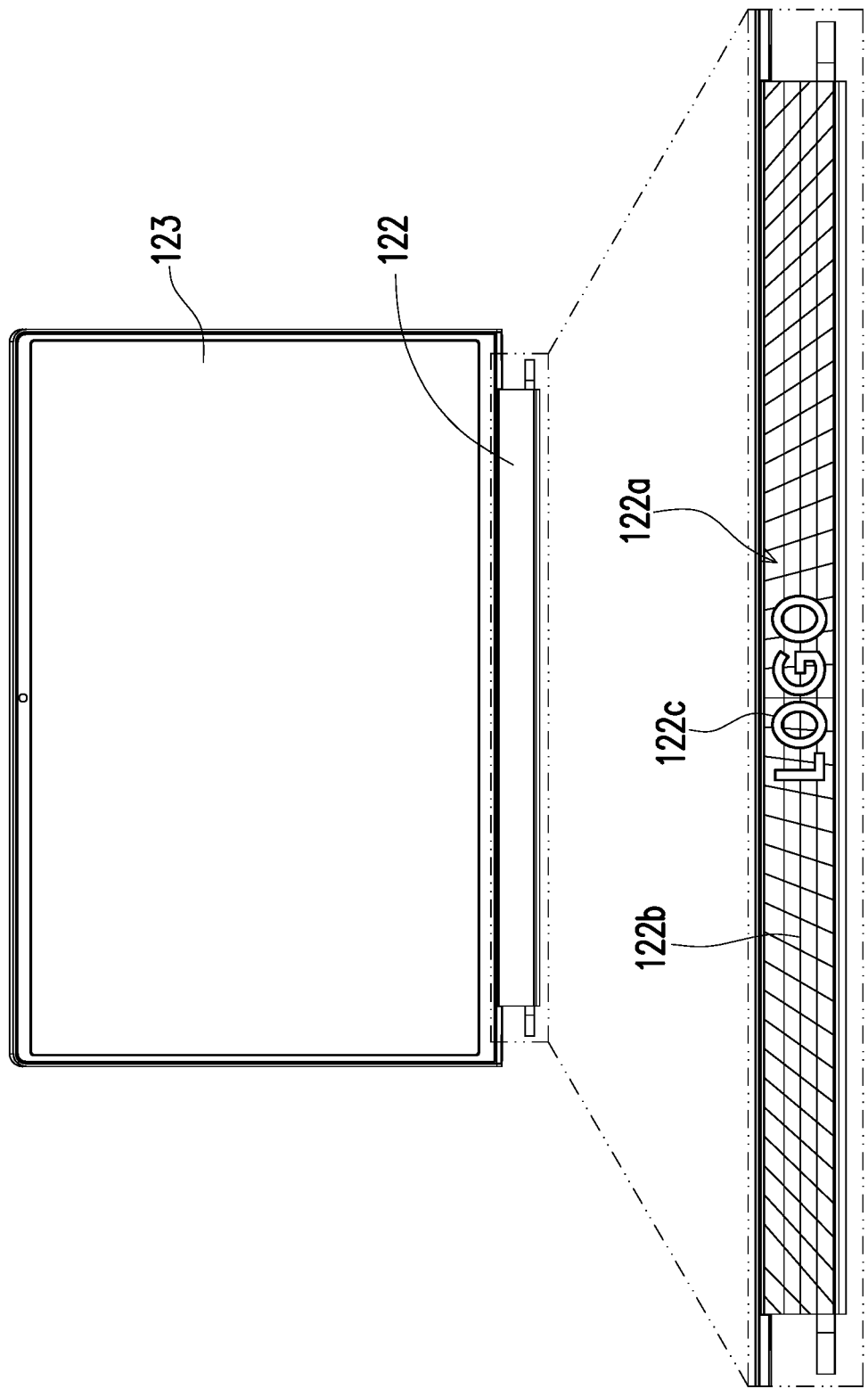
Figure 4C:
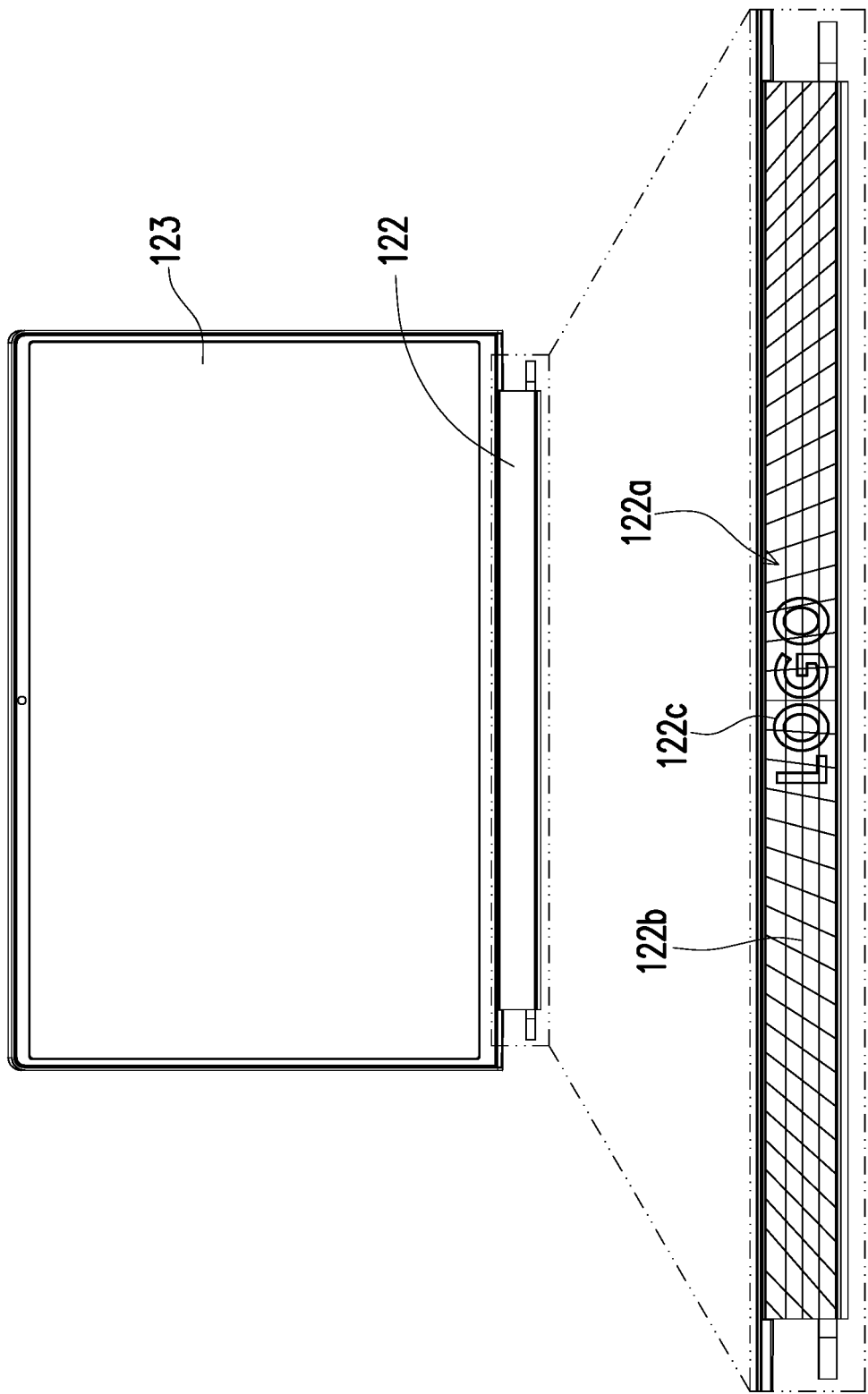

FIG. 4A to FIG. 4C are schematic diagrams of a second body according to different embodiments, respectively. Referring to FIG. 4A, according to this embodiment, the display part 123 of the second body 120 is located above the pivoting part 121 and the light reflecting part 122. The reflective surface 122a of the light reflecting part 122 may be patterned or surface treated to form a pattern 122b, such as using laser engraving, printing, texturing, or other applicable processes to form the pattern 122b on the reflective surface 122a, so as to produce light and shadow changes after light irradiation on the reflective surface 122a and bring different visual sensations to the user.

Referring to FIG. 4B, unlike the embodiment shown in FIG. 4A, the reflective surface 122a may be further patterned or surface treated to form a logo 122c, such as using laser engraving, printing, texturing, or other applicable processes to form the logo 122c on the reflective surface 122a. In detail, the logo 122c is superimposed on or in front of the pattern 122b, so as to produce light and shadow changes after light irradiation on the reflective surface 122a and bring different visual sensations to the user.

Referring to FIG. 4C, unlike the embodiment shown in FIG. 4A, the reflective surface 122a may be further patterned or surface treated to form the logo 122c, such as using laser engraving, printing, texturing, or other applicable processes to form the logo 122c on the reflective surface 122a. In detail, the pattern 122b is superimposed on or in front of the pattern 122c, so as to produce light and shadow changes after light irradiation on the reflective surface 122a and bring different visual sensations to the user.

Regarding the surface treatment of printing, when the light reflecting part 122 is made of transparent material, further surface treatment can be done by different ink layers. For example, the logo 122c or the pattern 122b is printed on the reflective surface 122a with fluorescent ink, then covered with transparent matte or high gloss ink on the logo 122c or the pattern 122b, and covered with a base layer such as black on a surface opposite the reflective surface 122a (i.e., the surface affixed to the pivoting part). For another example, the reflective surface 122a is covered with transparent matte or high gloss ink only, while the logo 122c or the pattern 122b with fluorescent ink is first printed on a surface opposite the reflective surface 122a, and finally covered with a black base layer on the logo 122c or the pattern 122b. Furthermore, the light source 150 is used with pure blue or blue mixed light color to produce light reaction with fluorescent ink. In this way, when the light source 150 does not irradiate the reflective surface 122a or irradiates the reflective surface 122a with other color light, the logo 122c or the pattern 122b is not clearly visible to the user, and only when the light with blue or blue mixed light is irradiated on the reflective surface 122a, the logo 122c or the pattern 122b will be clearly visible to the user on the reflective surface 122a.

To sum up, the electronic device of the disclosure, in line with the design requirement of thin and light weight of the product, has a light source disposed in the first body so as to lengthen the distance of the light emitted from the light source to the light reflecting part of the second body and further improve the light uniformity of the light reflected from the light reflecting part. On the other hand, when the transmission distance of light is lengthened, a small amount of light source still present excellent lighting effect, helping to reduce the cost of production. In addition, the light reflecting part may be patterned or surface treated with different light colors to bring users a richer visual experience.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. An electronic device, comprising:
a first body, comprising a first casing and a second casing movably disposed on the first casing;
a second body, having a pivoting part and a light reflecting part located at the pivoting part;
a pivoting shaft, connected with the pivoting part of the second body, wherein the second body is pivoted to the first body through the pivoting shaft, and the pivoting shaft is located in the first body;
a driving module, disposed in the first body, and contacting the second casing, wherein the driving module is connected to the pivoting shaft; and
a light source, disposed in the first body,
wherein when the second body rotates relative to the first body, the pivoting shaft drives the driving module, the driving module pushes the second casing to lift to form a light emitting slit between the second casing and the pivoting part of the second body, and light emitted from the light source is directed to the light reflecting part through the light emitting slit.

2. The electronic device according to claim 1, wherein the driving module comprises:
a first gear, connected to the pivoting shaft;
a second gear, engaged with the first gear;
a third gear, engaged with the second gear; and
a drive member, connected to a drive member of the third gear and contacting the second casing,
wherein when the second body rotates relative to the first body, the first gear rotates synchronously with the pivoting shaft, such that the first gear drives the second gear, the second gear drives the third gear, and the drive member rotates synchronously with the third gear and pushes the second casing to lift to form the light emitting slit between the second casing and the pivoting part of the second body.

3. The electronic device according to claim 2, wherein the drive member is coaxially disposed with the third gear.

4. The electronic device according to claim 2, wherein the first gear is coaxially disposed with the pivoting shaft.

5. The electronic device according to claim 2, wherein the drive member has a drive part and a support convex arc part connected to the drive part, the drive part contacts the second casing to push the second casing to rotate and lift relative to the first casing, when the second body rotates relative to the first body to an angle greater than a predetermined angle, the drive part is separated from the second casing, and the support convex arc part contacts the second casing.

6. The electronic device according to claim 5, wherein the second casing has a guide part facing the first casing and a buffer part connected to the guide part, the drive part slidingly contacts the guide part, when the second body rotates relative to the first body to an angle greater than the predetermined angle, the drive part is separated from the guide part, and the support convex arc part contacts the buffer part.

7. The electronic device according to claim 1, wherein the light source is disposed on the second casing corresponding to the light emitting slit, the first casing has a reflect part disposed corresponding to the light source and the light emitting slit, and the light emitted from the light source is directed to the reflect part, and then is reflected by the reflect part to the light emitting slit, and is directed to the light reflecting part through the light emitting slit.

8. The electronic device according to claim 7, wherein the light source is lifted with the second casing, and a distance between the light source and the reflect part is increased from a first distance to a second distance.

9. The electronic device according to claim 1, wherein the light source is disposed on the first casing corresponding to the light emitting slit, and the light emitted from the light source is directed to the light emitting slit, and is directed to the light reflecting part through the light emitting slit.

10. The electronic device according to claim 1, wherein the second body further has a display part connected to the pivoting part, there is a gap between a reflective surface of the light reflecting part and a display surface of the display part, and a part of the light reflecting part is located in the light emitting slit.

11. The electronic device according to claim 1, wherein the first body further comprises a third casing mounted on the first casing, the second casing has a first end pivotally connected to the third casing and a second end opposite to the first end, and the driving module contacts the second end.

12. The electronic device according to claim 11, wherein the second casing is located between the pivoting shaft and the third casing, when the second body rotates relative to the first body, the driving module pushes the second end of the second casing, such that the first end of the second casing rotates relative to the third casing, and the second end is lifted to form the light emitting slit with the pivoting part.

* * * * *